United States Patent
Wong et al.

(10) Patent No.: US 7,855,539 B1
(45) Date of Patent: Dec. 21, 2010

(54) CIRCUIT AND METHOD FOR ADAPTIVE CURRENT LIMIT CONTROL IN A POWER CONVERTER

(75) Inventors: Lik-Kin Wong, Tai Po (HK); Tze-Kau Man, Yuen Long (HK)

(73) Assignee: National Semiconductor Corporation, Santa Clara, CA (US)

(*) Notice: Subject to any disclaimer, the term of this patent is extended or adjusted under 35 U.S.C. 154(b) by 867 days.

(21) Appl. No.: 11/803,317

(22) Filed: May 14, 2007

(51) Int. Cl.
*G05F 1/40* (2006.01)
(52) U.S. Cl. ...................................... 323/283
(58) Field of Classification Search ................. 323/222, 323/277, 276, 282–288; 363/89, 95, 98
See application file for complete search history.

(56) References Cited

U.S. PATENT DOCUMENTS

| | | | |
|---|---|---|---|
| 4,023,111 A | 5/1977 | Mortensen | |
| 4,533,839 A | 8/1985 | Balakrishnan | |
| 6,281,485 B1 * | 8/2001 | Siri | ........................ 250/203.4 |
| 6,314,010 B1 | 11/2001 | Markow et al. | |
| 6,661,679 B1 | 12/2003 | Yang et al. | |
| 6,970,339 B2 | 11/2005 | Wong et al. | |
| 6,977,491 B1 | 12/2005 | Caldwell et al. | |
| 7,030,596 B1 | 4/2006 | Salerno et al. | |
| 7,170,267 B1 | 1/2007 | McJimsey | |
| 7,176,664 B1 | 2/2007 | Potanin et al. | |
| 7,432,695 B2 * | 10/2008 | Salerno | ...................... 323/284 |

OTHER PUBLICATIONS

Tawen Mei et al., "Circuit and Method for Average-Current Regulation of Light Emitting Diodes", U.S. Appl. No. 11/703,981, filed Feb. 8, 2007.
Lawrence Hok-Sun Ling, "System and Method for Providing a Pulsating Current Output Having Ultra Fast Rise and Fall Times", U.S. Appl. No. 11/731,961, filed Apr. 2, 2007.
Jonathan Knight, "Versatile System for High-Accuracy Current Limiting Circuitry", U.S. Appl. No. 11/268,761, filed Nov. 7, 2005.
Tawen Mai et al., "System and Method for Providing a Process, Temperature and Over-Drive Invariant Over-Current Protection Circuit", U.S. Appl. No. 11/784,766, filed Apr. 9, 2007.
Yang Yinfu et al., "Pulse by Pulse Current Limiting Technique for SPWM Inverters," IEEE 1999 International Conference on Power Electronics and Drive Systems, PEDS'99, Jul. 1999, Hong Kong, pp. 1021-1026.

* cited by examiner

*Primary Examiner*—Rajnikant B Patel

(57) ABSTRACT

A circuit includes a power converter configured to receive an input voltage and generate a regulated output voltage. The power converter includes an inductor. The circuit also includes a control loop configured to dynamically adjust a valley current limit of the power converter. The valley current limit identifies a minimum current through the inductor during a current-limited mode of operation. The regulated output voltage could be provided to a load configured to operate using the regulated output voltage. The control loop could be configured to dynamically adjust the valley current limit based on an average current through the inductor. The control loop could also be configured to dynamically adjust the valley current limit so that an output current reaches a desired average value during the current-limited mode of operation. The power converter could represent a buck converter, a boost converter, a buck-boost converter, or a hysteretic control power converter.

20 Claims, 5 Drawing Sheets

CIRCUIT AND METHOD FOR ADAPTIVE CURRENT LIMIT CONTROL IN A POWER CONVERTER

TECHNICAL FIELD

This disclosure is generally directed to integrated circuits and more specifically to a circuit and method for adaptive current limit control in a power converter.

BACKGROUND

Power converters are used in a wide variety of electronic devices. For example, power converters are often used to convert a voltage from an input voltage source into a different voltage suitable for use by an electronic circuit. There are several types of power converters, such as buck, boost, and buck-boost converters.

FIG. 1 illustrates a conventional power converter circuit 100, which includes a power converter 102. In this example, the power converter 102 represents a conventional buck, boost, buck-boost, or other converter having an inductor 104 and one or more switches 106. The power converter 102 is coupled to an input voltage source 108, an output capacitor 110, and a load 112. An input voltage $V_{IN}$ is provided to the power converter 102 by the input voltage source 108. The power converter 102 generates an output current $I_{OUT}$ across the load 112, which creates an output voltage $V_{OUT}$ across the load 112. The power converter 102 does this by alternatively coupling the inductor 104 to the input voltage source 108 and the load 112. This creates a current $I_L$ through the inductor 104, and the output current $I_{OUT}$ is generally equal to the average of the inductor current $I_L$.

Conventional power converters often monitor the output current $I_{OUT}$ or output voltage $V_{OUT}$ and inhibit the charging of the inductor 104 at certain times. FIGS. 2 and 3 illustrate operational characteristics of the conventional power converter circuit 100. In FIG. 2, a graph 200 plots the inductor current $I_L$ over time. During time 202, the power converter circuit 100 is in a normal mode of operation, and the inductor current $I_L$ varies up and down at a lower level as the inductor 104 is charged and discharged. The inductor current $I_L$ then begins increasing, which may occur when the load 112 changes, for example. The power converter circuit 100 then enters a current-limited mode of operation during time 204. During time 204, the output current $I_{OUT}$ ideally has an average value equal to $I_{CL}$. Also, during time 204, the inductor current $I_L$ ideally does not fall below a valley current limit $I_V$.

As shown in FIG. 3 in exaggerated form, however, there is typically a delay 302 between the time that the inductor current $I_L$ falls below the valley current limit $I_V$ and the time that the inductor current $I_L$ stops falling and begins increasing. This delay 302 is typically due to the time needed to detect the inductor current $I_L$ reaching the valley current limit $I_V$ and the time needed to begin charging the inductor 104. This results in an actual valley current limit $I_N$ that is lower than the desired valley current limit $I_V$.

An actual valley current limit that is lower than desired typically results in a reduction of the available output current $I_{OUT}$ during the current-limited mode of operation. One approach to solving this problem involves using larger inductors 104 since this problem is typically more significant for smaller inductors 104. However, this approach often results in the over-design of the inductor 104. Another approach involves setting the desired valley current limit $I_V$ higher so that the actual valley current limit $I_N$ is closer to the desired value. However, this results in a higher peak inductor current $I_L$ and requires an inductor with a higher saturation current, again resulting in the over-design of the inductor 104.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 4 through 7, discussed below, and the various embodiments used to describe the principles of the present invention in this patent document are by way of illustration only and should not be construed in any way to limit the scope of the present invention. Those skilled in the art will understand that the principles of the present invention may be implemented in any type of suitably arranged device or system.

Figure 1:
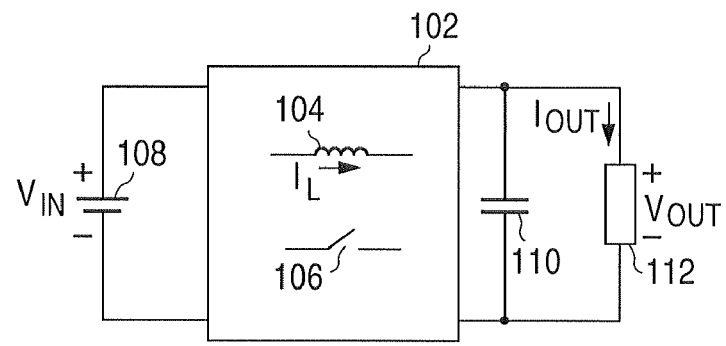
FIG. 1 illustrates a conventional power converter circuit.
Figure 2:
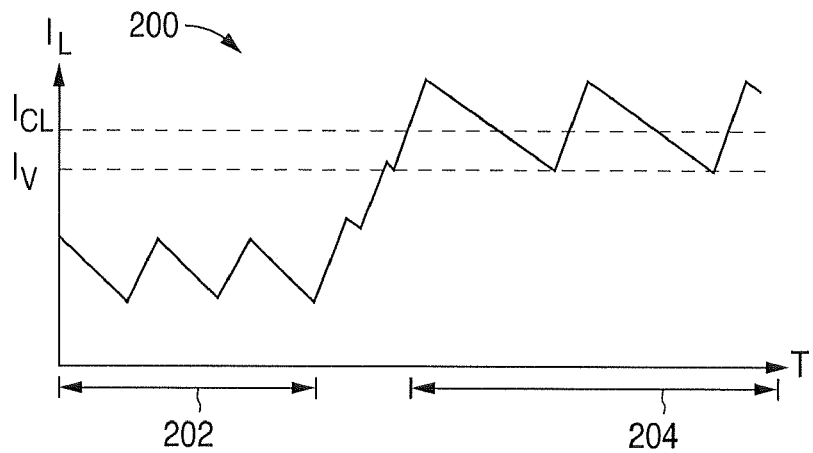
FIGS. 2 and 3 illustrate operational characteristics of the conventional power converter circuit.
Figure 3:
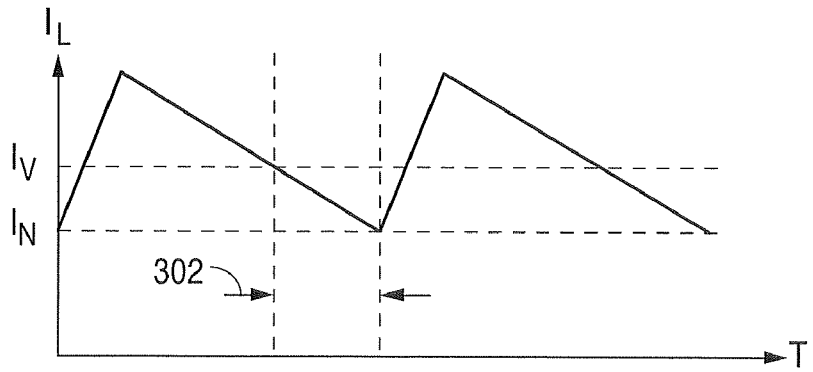
Figure 4:
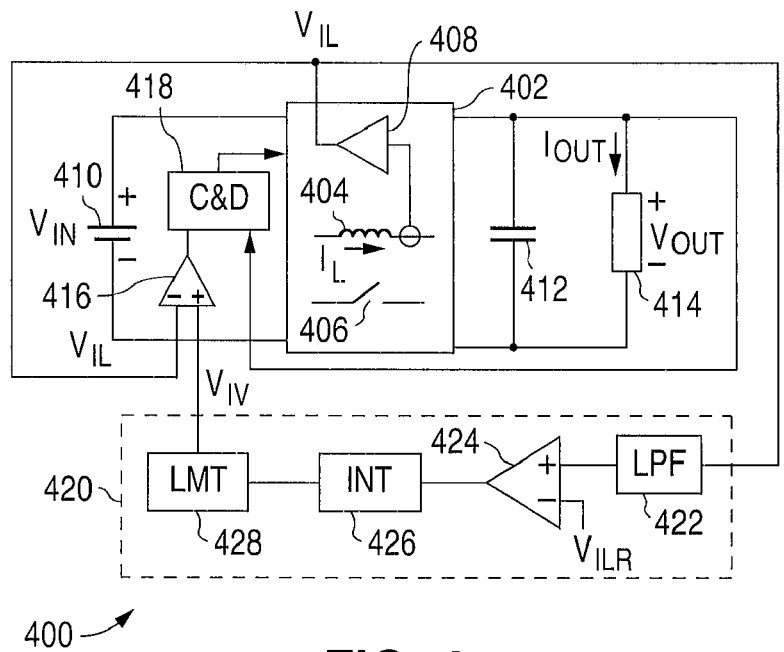
FIG. 4 illustrates an example power converter circuit according to one embodiment of this disclosure.

FIG. 4 illustrates an example power converter circuit 400 according to one embodiment of this disclosure. The embodiment of the power converter circuit 400 shown in FIG. 4 is for illustration only. Other embodiments of the power converter circuit 400 could be used without departing from the scope of this disclosure.

As shown in FIG. 4, the power converter circuit 400 includes a power converter 402. The power converter 402 could represent any suitable type of power converter or regulator. As particular examples, the power converter 402 could represent a buck, boost, or buck-boost converter (with or without hysteretic control). The power converter 402 could also represent a constant on-time hysteretic control buck, boost, or buck-boost converter. The power converter 402 generally includes an inductor 404 and one or more switches 406. In this example, the power converter 402 also includes a transimpedance amplifier 408 coupled to the inductor 404. The transimpedance amplifier 408 generates a voltage $V_{IL}$ that is proportional to a current $I_L$ through the inductor 404. The transimpedance amplifier 408 includes any suitable structure for generating a voltage proportional to a current, such as a transimpedance amplifier having $A_z=1$.

The power converter 402 is coupled to an input voltage source 410, an output capacitor 412, and a load 414. The voltage source 410 provides an input voltage $V_{IN}$, which may be variable. The voltage source 410 could represent any suitable source of voltage, such as a battery. An output current $I_{OUT}$ produced by the power converter 402 creates an output voltage $V_{OUT}$ across the load 414. The load 414 is generally coupled to and powered by the power converter 402. The output capacitor 412 may help to remove transients in the output current $I_{OUT}$/output voltage $V_{OUT}$.

In this example, additional components are used to modify and control the operation of the power converter 402. For example, the power converter circuit 400 includes a comparator 416 and a controller and driver (C&D) 418. The power converter circuit 400 also includes an outer control loop 420, which includes a low-pass filter (LFP) 422, an amplifier 424, an integrator (INT) 426, and a limiter (LMT) 428.

The comparator 416 compares the voltage $V_{IL}$ produced by the transimpedance amplifier 408 to a voltage $V_{IV}$ produced by the outer control loop 420. The voltage $V_{IV}$ is proportional to a valley current limit for the power converter 402. The comparator 416 generates outputs based on the comparisons, such as a logical one value or a logical zero value indicating whether the voltage $V_{IL}$ exceeds the voltage $V_{IV}$. The comparator 416 includes any suitable structure for comparing voltages.

The controller and driver 418 receive an output from the comparator 416 and the output voltage $V_{OUT}$. The controller and driver 418 use these inputs to generate one or more control signals for the power converter 402. For example, the controller and driver 418 could drive the one or more switches 406 in the power converter 402 to provide the desired operation by the power converter 402. The controller and driver 418 could also determine when the power converter 402 needs to enter a current-limited mode of operation and control the one or more switches 406 accordingly. When multiple switches 406 are used in the power converter 402, the controller and driver 418 could further ensure that the switches 406 are opened and closed in a proper manner, such as by ensuring that only one switch 406 is closed at any given time. The controller and driver 418 could control the power converter 402 to provide any suitable functionality, such as controlling the power converter 402 based on the output voltage $V_{OUT}$, output current $I_{OUT}$, input voltage $V_{IN}$, or temperature. The controller and driver 418 include any suitable structure(s) for controlling the operation of and driving the power converter 402.

In the outer control loop 420, the low-pass filter 422 receives and filters the voltage $V_{IL}$ produced by the transimpedance amplifier 408. The low-pass filter 422 therefore generates an output approximately equal to the average of the voltage $V_{IL}$. The low-pass filter 422 includes any suitable structure for filtering a voltage signal.

The output of the low-pass filter 422 and a reference voltage $V_{ILR}$ are received by the amplifier 424. The reference voltage $V_{ILR}$ represents a voltage that is proportional to a desired valley current limit. The amplifier 424 generates outputs by amplifying any differences between the voltage $V_{ILR}$ and the average of the voltage $V_{IL}$. The amplifier 424 includes any suitable structure for amplifying voltages.

The outputs of the amplifier 424 are provided to the integrator 426, which integrates the amplifier outputs and produces integrated outputs. The limiter 428 prevents the integrated outputs of the integrator 426 from becoming too high during operation of the power converter 402. The voltage $V_{IV}$ is provided by the outer control loop 420 to the comparator 416. The voltage $V_{IV}$ is typically generated by the integrator 426, unless the limiter 428 limits the voltage $V_{IV}$ from exceeding an upper value. The integrator 426 includes any suitable structure for integrating voltage signals. The limiter 428 includes any suitable structure for limiting a voltage signal.

In one aspect of operation, the power converter circuit 400 modifies its valley current limit using the outer control loop 420. More specifically, the outer control loop 420 is capable of adjusting the voltage $V_{IV}$, which is proportional to the valley current limit of the power converter 402. The outer control loop 420 does this by sensing and regulating the average current through the inductor 404. By adjusting the voltage $V_{IV}$, the outer control loop 420 can effectively adjust and adaptively alter the valley current limit of the power converter 402. This allows the valley current limit to be adapted dynamically during operation of the power converter circuit 400. Among other things, this may allow the power converter circuit 400 to more accurately regulate its average output current $I_{OUT}$ during the current-limited mode of operation. This may also reduce the need to over-design the inductor 404.

Although FIG. 4 illustrates one example of a power converter circuit 400, various changes may be made to FIG. 4. For example, other circuitry could be used to perform the functions of the various components shown in FIG. 4.

Figure 5A:
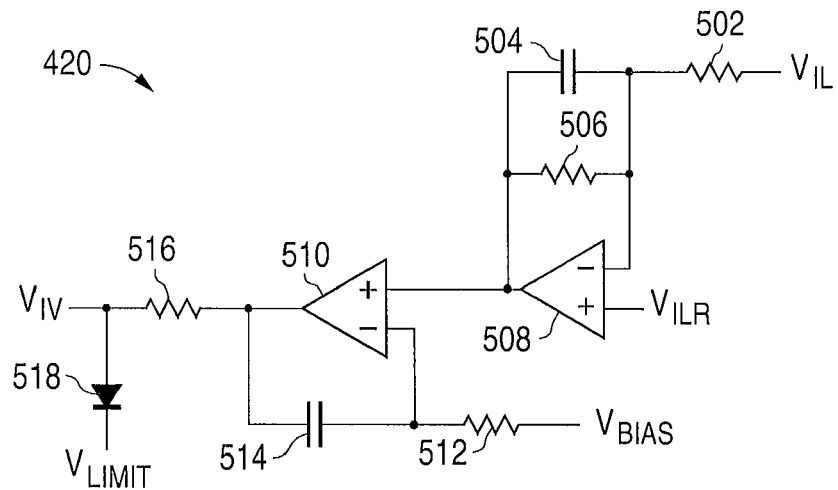
FIGS. 5A and 5B illustrate example control loops in a power converter circuit according to one embodiment of this disclosure.
Figure 5B:
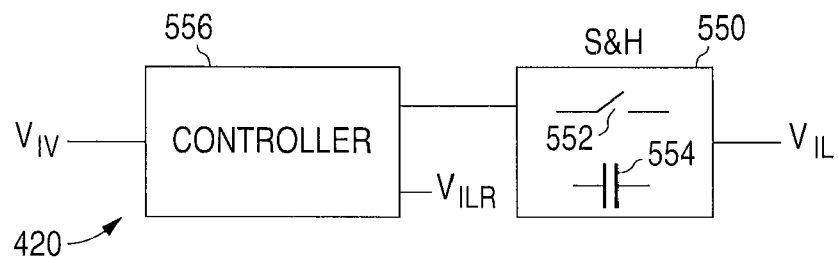

FIGS. 5A and 5B illustrate example control loops in a power converter circuit according to one embodiment of this disclosure. In particular, FIGS. 5A and 5B illustrate example embodiments of the outer control loop 420 in the power converter circuit 400 of FIG. 4. The embodiments of the outer control loop 420 in FIGS. 5A and 5B are for illustration only. Other embodiments of the outer control loop 420 could be used without departing from the scope of this disclosure.

As shown in FIG. 5A, the voltage $V_{IL}$ produced by the transimpedance amplifier 408 is provided to a resistor 502. The resistor 502 is coupled to a capacitor 504 and a resistor 506, which are coupled in parallel. The resistor 502, capacitor 504, and resistor 506 are also coupled to an inverting input of an amplifier 508, and the capacitor 504 and resistor 506 are also coupled to an output of the amplifier 508. A non-inverting input of the amplifier 508 receives the reference voltage $V_{ILR}$, which is proportional to a desired valley current limit.

The output of the amplifier 508 is coupled to a non-inverting input of an amplifier 510. The inverting input of the amplifier 510 is coupled to a resistor 512 and a capacitor 514. The resistor 512 is also coupled to a bias voltage $V_{BIAS}$, which is used to control an input bias current of the integrator 426 (which includes the amplifier 510). The capacitor 514 is also coupled to an output of the amplifier 510.

The output of the amplifier 508 is coupled to a resistor 516. The output of the control loop 420 (the voltage $V_{IV}$) is provided after the resistor 516. A diode 518 couples the resistor 516 (and the voltage $V_{IV}$) to a limit voltage $V_{LIMIT}$. The limit voltage $V_{LIMIT}$ approximately equals the maximum level of the voltage $V_{IV}$.

As shown in FIG. 5B, the voltage $V_{IL}$ produced by the transimpedance amplifier 408 is provided to a sample and hold circuit (S&H) 550. The sample and hold circuit 550 includes one or more switches 552 and one or more capacitors 554. The one or more switches 552 are used to allow the one or more capacitors 554 to sample the voltage $V_{IL}$ and to output the sampled voltage to a controller 556. The controller 556 uses the sampled values of the voltage $V_{IL}$ and the reference voltage $V_{ILR}$ to generate the output of the control loop 420 (the voltage $V_{IV}$). For example, the controller 556 could adjust the voltage $V_{IV}$ up or down so that the voltage $V_{IL}$ produced by the transimpedance amplifier 408 is close or equal to the reference voltage $V_{ILR}$. The sample and hold circuit 550 includes any suitable structure for sampling a voltage signal and outputting the sampled value. The controller 556 includes any suitable hardware, software, firmware, or combination thereof for adjusting a voltage $V_{IV}$ that is proportional to a valley current limit for a power converter.

Although FIGS. 5A and 5B illustrate examples of a control loop 420 in a power converter circuit 400, various changes may be made to FIGS. 5A and 5B. For example, other circuitry could be used to perform the functions of the various components shown in FIGS. 5A and 5B.

Figure 6A:
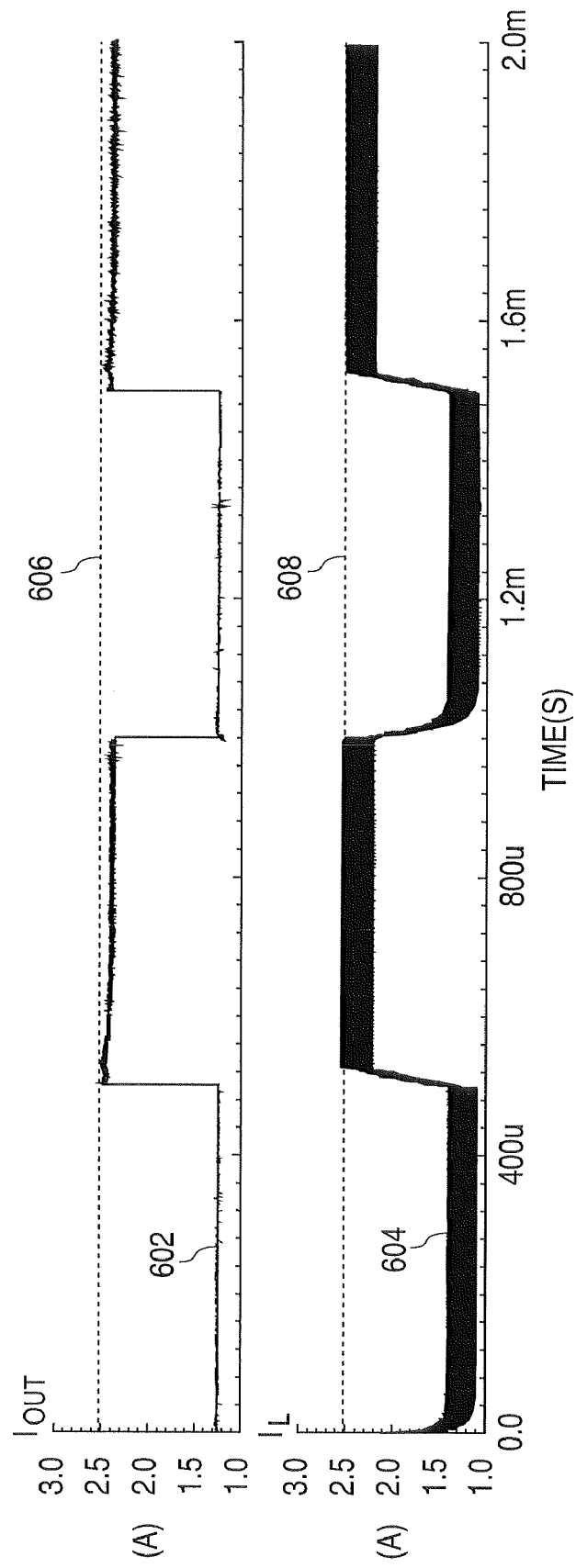
FIGS. 6A and 6B illustrate example operational characteristics of power converter circuits according to one embodiment of this disclosure.
Figure 6B:
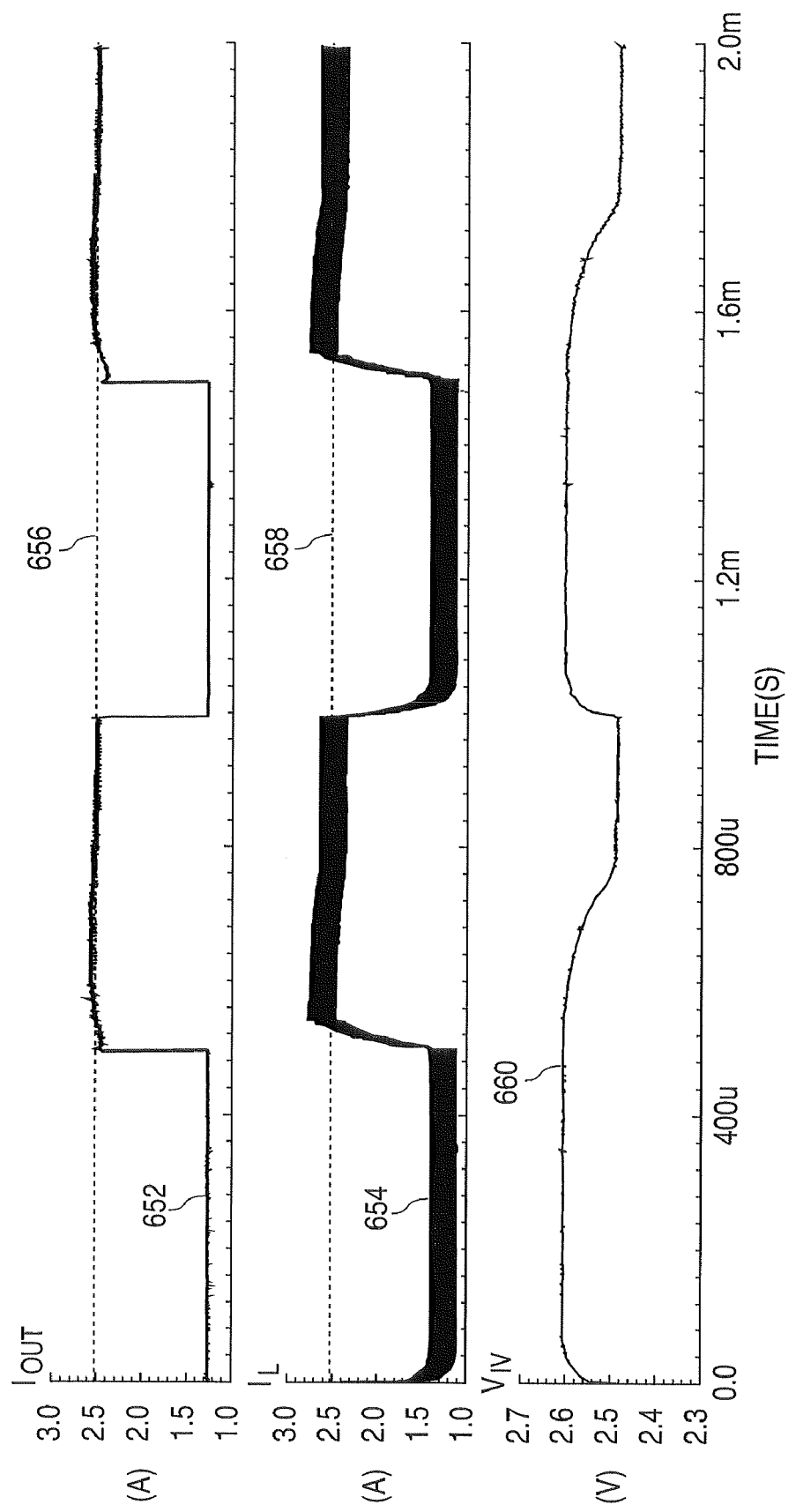

FIGS. 6A and 6B illustrate example operational characteristics of power converter circuits according to one embodiment of this disclosure. The operational characteristics shown in FIGS. 6A and 6B are for illustration only. The power converter circuit 400 of FIG. 4 could operate in any other or additional manner without departing from the scope of this disclosure.

FIG. 6A illustrates the operation of a conventional power converter circuit 100 using a buck converter. The input voltage $V_{IN}$ is 8V, and the output voltage $V_{OUT}$ is 3.3V. Also, the output capacitance (output capacitor 110) is 47 µF, and the power converter inductance (inductor 104) is 10 µH. The charging time of the inductor 104 (known as the "on-time") in the power converter 102 is 0.8 µs. The desired output current ($I_{CL}$) during a current-limited mode of operation is 2.5 A. The valley current limit $I_V$ is 2.35 A, and a ripple of 0.3 A can occur in the inductor current $I_L$. A load change from 2.64Ω to 1.1Ω occurs, which leads to operation of the power converter 102 in current-limited mode.

In FIG. 6A, line 602 represents the output current $I_{OUT}$ and line 604 represents the inductor current $I_L$ of the conventional power converter circuit 100. As shown here by the dashed lines 606-608, the output current $I_{OUT}$ and the inductor current $I_L$ both settle at levels below the desired level of 2.5 A at current limit. This indicates that the actual output current $I_{OUT}$ cannot reach the desired output current $I_{CL}$ of 2.5 A, and a reduction in available output current $I_{OUT}$ occurs during the current-limited mode of operation.

FIG. 6B illustrates the operation of the power converter circuit 400 of FIG. 4. The operating conditions are the same as those above, and the reference voltage $V_{ILR}$ used in the outer control loop 420 is set to a level proportional to 2.5 A. In FIG. 6B, line 652 represents the output current $I_{OUT}$ and line 654 represents the inductor current $I_L$ of the power converter circuit 400. As shown here by the dashed lines 656-658, the output current $I_{OUT}$ and the inductor current $I_L$ both reach (after some settling time) levels near the desired level of 2.5 A at current limit. As a result, the actual output current $I_{OUT}$ more closely reaches the desired output current $I_{CL}$ of 2.5 A at current limit.

This is accomplished by adjusting the voltage $V_{IV}$ dynamically as shown by line 660. Since the voltage $V_{IV}$ is proportional to the valley current limit, this allows the valley current limit of the power converter 402 to be adjusted dynamically. Because of this, the output current $I_{OUT}$ at current limit obtains a desired average value without requiring over-design of the inductor 404. Moreover, this may help to eliminate the reduction of available output current seen in conventional power converter circuits. In addition, this may help to provide for control over the true average current output of a power converter, such as in hysteretic-controlled current regulators.

Although FIGS. 6A and 6B illustrate examples of the operational characteristics of power converter circuits, various changes may be made to FIGS. 6A and 6B. For example, the operational characteristics of the conventional power converter circuit 100 and the power converter circuit 400 are provided for illustration and explanation only and are not meant to limit the operation or behavior of the power converter circuit 400.

Figure 7:
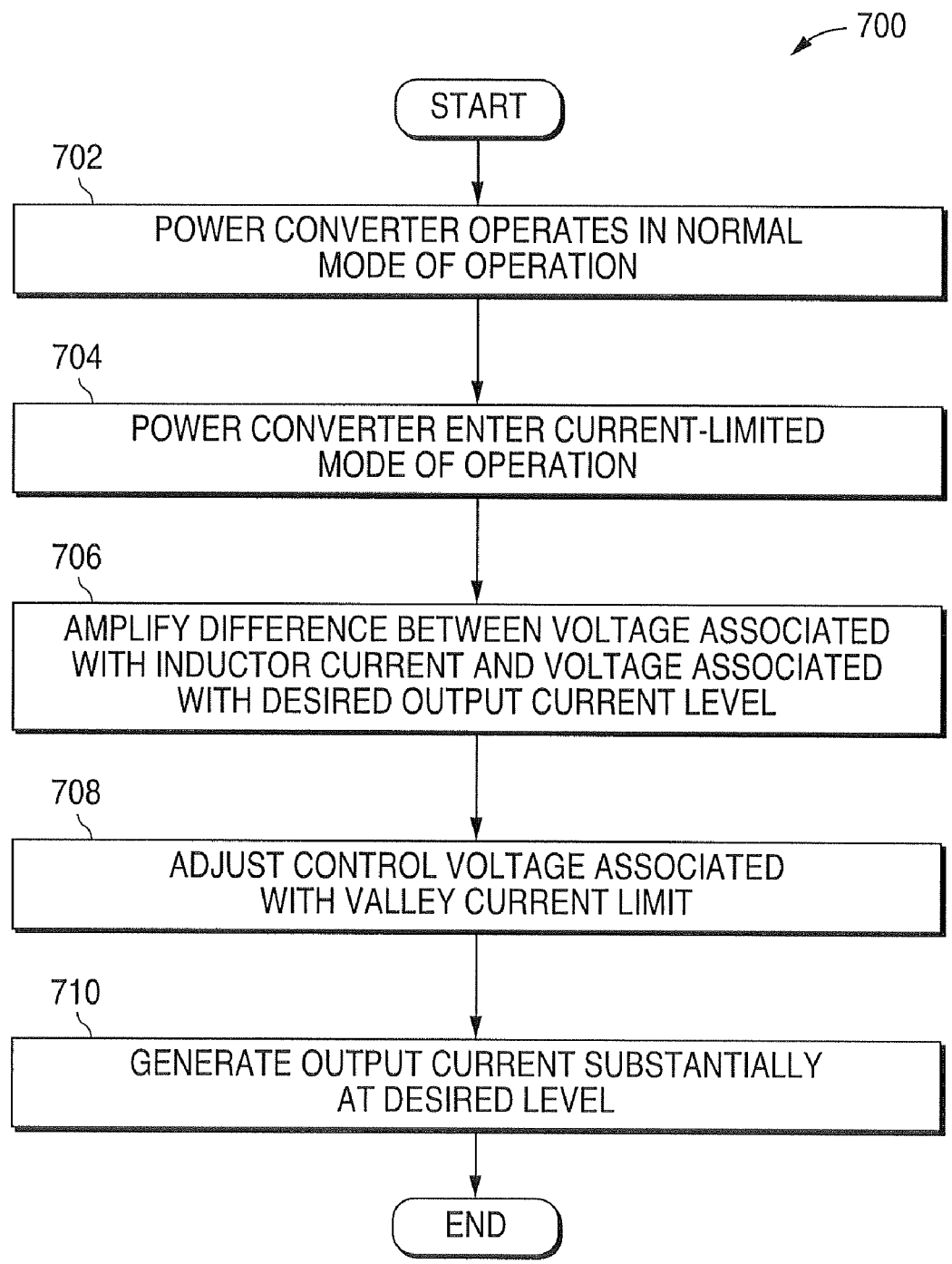
FIG. 7 illustrates an example method for adaptive current limit control in a power converter according to one embodiment of this disclosure.

FIG. 7 illustrates an example method 700 for adaptive current limit control in a power converter according to one embodiment of this disclosure. For ease of explanation, the method 700 is described with respect to the power converter circuit 400 of FIG. 4. The method 700 could be used with any other suitable circuit, device, or system.

A power converter operates in a normal mode of operation at step 702. This could include, for example, the power converter 402 operating such that the output current $I_{OUT}$ is generally below a threshold level. The power converter enters a current-limited mode of operation at step 704. This may include, for example, the output current $I_{OUT}$ increasing to a point where the charging of the inductor 404 needs to be inhibited.

At this point, the power converter 402 operates in the current-limited mode of operation. A difference between a voltage associated with an inductor current $I_L$ and a voltage associated with a desired output current level is amplified at step 706. This may include, for example, the amplifier 424 in the outer control loop 420 amplifying any differences between the average of the voltage $V_{IL}$ and the reference voltage $V_{ILR}$.

Based on this, a control voltage associated with a valley current limit is adjusted at step 708. This may include, for example, integrating the outputs of the amplifier 424 in the outer control loop 420 and possibly limiting the integrated result to a limit voltage $V_{LIMIT}$. An output current that is substantially at a desired level is then generated at step 710. This may include, for example, generating an output current $I_{OUT}$ that is substantially at a current level proportional to the reference voltage $V_{ILR}$ (note that some settling time may be needed to reach this level). The output current $I_{OUT}$ may have more available current at current limit compared to conventional power converters. Also, the output current $I_{OUT}$ at current limit may be controlled so that it has a true desired average value.

Although FIG. 7 illustrates one example of a method 700 for adaptive current limit control in a power converter, various changes may be made to FIG. 7. For example, while shown as a series of steps, various steps in FIG. 7 could overlap or occur in parallel.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A circuit comprising:
   a power converter configured to receive an input voltage and generate a regulated output voltage, the power converter comprising an inductor and circuitry configured to generate a first voltage based on a current through the inductor;
   a control loop configured to dynamically adjust a second voltage associated with a valley current limit of the power converter using the first voltage, the valley current limit identifying a minimum current through the inductor during a current-limited mode of operation; and
   a comparator configured to compare the first voltage and the second voltage.

2. The circuit of claim 1, wherein the control loop is configured to dynamically adjust the second voltage based on an average current through the inductor.

3. The circuit of claim 2, wherein the control loop is configured to determine an average of the first voltage in order to dynamically adjust the second voltage.

4. The circuit of claim 1, wherein the control loop comprises:
   a filter configured to receive the first voltage;
   an amplifier configured to amplify differences between outputs of the filter and a reference voltage;
   an integrator configured to integrate outputs of the amplifier; and
   a limiter configured to limit outputs of the integrator to a maximum value.

5. The circuit of claim 1, wherein the control loop comprises:
   a sample and hold circuit configured to receive and sample the first voltage; and
   a controller configured to generate the second voltage based on an output of the sample and hold circuit and a reference voltage.

6. The circuit of claim 1, further comprising:
   a controller and driver configured to control and drive the power converter based on outputs of the comparator.

7. The circuit of claim 1, wherein the circuitry configured to generate the first voltage comprises a transimpedance amplifier.

8. The circuit of claim 1, wherein the power converter comprises one of: a buck converter, a boost converter, a buck-boost converter, and a hysteretic control power converter.

9. An apparatus comprising:
   a power conversion circuit configured to receive an input voltage and generate a regulated output voltage, the power conversion circuit also configured to dynamically adjust a valley current limit associated with an inductor in the power conversion circuit, the valley current limit identifying a minimum current through the inductor during a current-limited mode of operation, the power conversion circuit comprising:
      circuitry configured to generate a first voltage based on a current through the inductor;
      a control loop configured to dynamically adjust a second voltage associated with the valley current limit using the first voltage; and
      a comparator configured to compare the first voltage and the second voltage; and
   a load configured to receive the regulated output voltage.

10. The apparatus of claim 9, wherein the control loop is configured to dynamically adjust the second voltage based on an average current through the inductor.

11. The apparatus of claim 9, wherein:
    the power conversion circuit is further configured to cause the current through the inductor to vary up and down during a normal mode of operation; and
    the current through the inductor during the normal mode of operation is lower than the minimum current through the inductor during the current-limited mode of operation.

12. The apparatus of claim 10, wherein the control loop is configured to determine an average of the first voltage in order to dynamically adjust the second voltage.

13. The apparatus of claim 9, wherein the control loop comprises:
    a filter configured to receive the first voltage;
    an amplifier configured to amplify differences between outputs of the filter and a reference voltage;
    an integrator configured to integrate outputs of the amplifier; and
    a limiter configured to limit outputs of the integrator to a maximum value.

14. The apparatus of claim 9, wherein the control loop comprises:
    a sample and hold circuit configured to receive and sample the first voltage; and
    a controller configured to generate the second voltage based on an output of the sample and hold circuit and a reference voltage.

15. The apparatus of claim 9, wherein the power converter comprises one of: a buck converter, a boost converter, a buck-boost converter, and a hysteretic control power converter.

16. A method comprising:
    receiving an input voltage;
    generating a regulated output voltage using a power converter that comprises an inductor; and
    dynamically adjusting a valley current limit during generation of the regulated output voltage, the valley current limit identifying a minimum current through the inductor in the power converter during a current-limited mode of operation, wherein dynamically adjusting the valley current limit comprises:
       generating a first voltage based on a current through the inductor;
       dynamically adjusting a second voltage associated with the valley current limit using the first voltage; and
       comparing the first voltage and the second voltage.

17. The method of claim 16, wherein dynamically adjusting the valley current limit comprises dynamically adjusting the second voltage based on an average current through the inductor.

18. The method of claim 17, wherein dynamically adjusting the second voltage comprises amplifying differences between an average of the first voltage and a reference voltage, the reference voltage associated with a desired valley current limit.

19. The method of claim 17, wherein dynamically adjusting the second voltage comprises:
    sampling the first voltage; and
    generating the second voltage based on the sampled first voltage and a reference voltage, the reference voltage associated with a desired valley current limit.

20. The method of claim 16, further comprising:
    generating an output current having a desired average value during the current-limited mode of operation.

* * * * *